US006693292B1

(12) United States Patent
Lewis

(10) Patent No.: US 6,693,292 B1
(45) Date of Patent: Feb. 17, 2004

(54) OPTICAL SPOT SENSOR

(75) Inventor: Robert A. Lewis, Sunnyvale, CA (US)

(73) Assignee: Vishay Infrared Components, Inc., Santa Clara, CA (US)

(*) Notice: Subject to any disclaimer, the term of this patent is extended or adjusted under 35 U.S.C. 154(b) by 0 days.

(21) Appl. No.: 09/343,315

(22) Filed: Jun. 30, 1999

(51) Int. Cl.[7] .......... G01N 21/86
(52) U.S. Cl. .......... 250/559.29
(58) Field of Search .......... 250/559.29; 356/615, 356/620, 622

(56) References Cited

U.S. PATENT DOCUMENTS

| | | | | | |
|---|---|---|---|---|---|
| 4,328,504 | A | * | 5/1982 | Weber et al. | 346/25 |
| 4,608,646 | A | | 8/1986 | Goodrich et al. | 364/478 |
| 4,900,153 | A | * | 2/1990 | Weber et al. | 356/430 |
| 5,377,279 | A | * | 12/1994 | Hanafusa et al. | 382/141 |
| 5,499,094 | A | * | 3/1996 | Swierczek | 356/121 |
| 5,691,811 | A | * | 11/1997 | Kihira | 356/239.1 |
| 5,726,443 | A | * | 3/1998 | Immega et al. | 250/208.1 |
| 5,945,685 | A | * | 8/1999 | Imaino et al. | 356/239.1 |

FOREIGN PATENT DOCUMENTS

| | | | |
|---|---|---|---|
| GB | 2 039 030 | 7/1980 | G05D/3/12 |
| GB | 2 317 691 | 4/1998 | G06T/7/00 |
| JP | 58-162350 | 9/1983 | B41J/3/10 |

OTHER PUBLICATIONS

Copy of Search Report for GB Appln. No. 0015862.6; date search was completed: Oct. 25, 2000.

* cited by examiner

*Primary Examiner*—Zandra V. Smith
(74) *Attorney, Agent, or Firm*—Fish & Richardson P.C.

(57) ABSTRACT

A spot detector including a light source with a lens arranged in the path of the light from the source and a lens disposed in the path of the light reflected from the medium surface. An opaque mask is provided on the far side of the receiving lens. The opaque mask is configured with at least one slit such that the size and location in two dimensions of a single spot may be detected. A photodetector generates a voltage proportional to the amount of light impinging on its photosensitive surface, which depends upon whether or not a spot is present. According to one embodiment of he present invention, a layered mask is provided wherein the optical working distance to a given mask opening is staggered by placing it on different mask substrate layers. Accordingly, different portions of the depth of field can be resolved.

23 Claims, 16 Drawing Sheets

OPTICAL SPOT SENSOR

BACKGROUND OF THE INVENTION

1. Field of the Invention

The present invention relates to an optical device for detecting the size and/or location of a spot on a surface.

2. Description of the Related Art

The present invention relates to an optical device, comprising an optical emitter and an optical detector, for illuminating a spot on a surface of an object, detecting the light reflected from the surface and determining the size and/or location of the spot on the surface. Although this invention has a wide variety of applications, the preferred embodiment is described in connection with an ink jet printer.

In ink jet printing, droplets of ink are selectively propelled from a plurality of drop ejectors in a print head, in accordance with digital instructions, to create a desired image on a copy surface. The print head typically includes a linear array of ejectors for conveying the ink to the copy medium, such as paper, overhead transparencies, and the like. The print head may move back and forth relative to a surface, for example, to print characters, or the linear array may extend across the entire width of a copy sheet moving relative to the print head. The ejectors typically include capillary channels or other ink passageways which are connected to one or more ink supply manifolds. Ink from the manifolds is retained within each channel until, in response to an appropriate signal, the ink in the channels is rapidly heated and vaporized by a heating element, such as a thermal resistor, disposed within the channel. This rapid vaporization of the ink creates a bubble which causes a quantity of ink to be ejected through the nozzle onto the copy sheet. When a quantity of ink in the form of a droplet is ejected from the ejector to a copy surface, the resulting spot becomes part of a desired image.

Selection of spot location for a large number of droplets is crucial to image quality in ink jet printing. If the locations of droplets ejected from the print head over the course of producing a single document vary significantly, the lack of uniformity will have noticeable effect on the quality of the image. This is particularly important in color printing, since different colored images must be overlaid on one another. A misalignment of the images can result in a defocused, staggered appearance.

In order to ensure proper alignment of the ejectors and to ensure that all the ejectors are firing properly, test patterns made up of a plurality of spots may be printed onto the copy surface in an unobtrusive location and then illuminated by an LED. A reflected signal is detected by a photodetector. If a spot is present, a different signal results from when the spot is absent. It is known to provide a mask between the copy medium and the photodetector to detect individual spots of the pattern. For example, the system disclosed in U.S. Pat. No. 4,907,013 provides a linear plurality of spots which are detected with the help of a mask having a slit approximately the same width as the spots. The spots are at an angle from the direction of motion such that detection of an X and Y location of each spot may be determined. However, the system described therein requires a plurality of spots that are visible to the naked eye and a mask slit which is approximately the same width as each spot. The longitudinal direction can only be determined by the angled disposition of the spots, and the spot size cannot be determined.

In addition, such known spot detection systems are deficient in that the effective image produced degrades over a large depth of field. This problem can be overcome by changing the operating distance between the mask and the receiver optics as the operating distance to the paper is varied. However, this solution is mechanically complex and expensive.

Accordingly, there is a need for a spot detector which is capable of detecting a single spot and which is further capable of determining both the spot size and transverse and longitudinal location. There is a further need for an improved method for a spot detector having reduced effective image degradation over a large depth of field.

SUMMARY OF THE INVENTION

These and other problems in the prior art are overcome in large part by a spot detector according to the present invention. A spot detector according to an embodiment of the present invention includes a light source with a lens arranged in the path of the light from the source and a lens disposed in the path of the light reflected from the medium surface and received by a photodetector. An opaque mask is provided and configured with at least one slit. The mask is used as a position and size detector. Depending on the size of the spot and the path of the spot relative to the mask, the photodetector is able to generate voltage pulse patterns as a function of the size and location of the spot. According to one embodiment of the present invention, a layered mask is provided wherein the optical working distance to a given mask opening is staggered by placing it on different mask substrate layers. Accordingly, different portions of the depth of field can be resolved.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
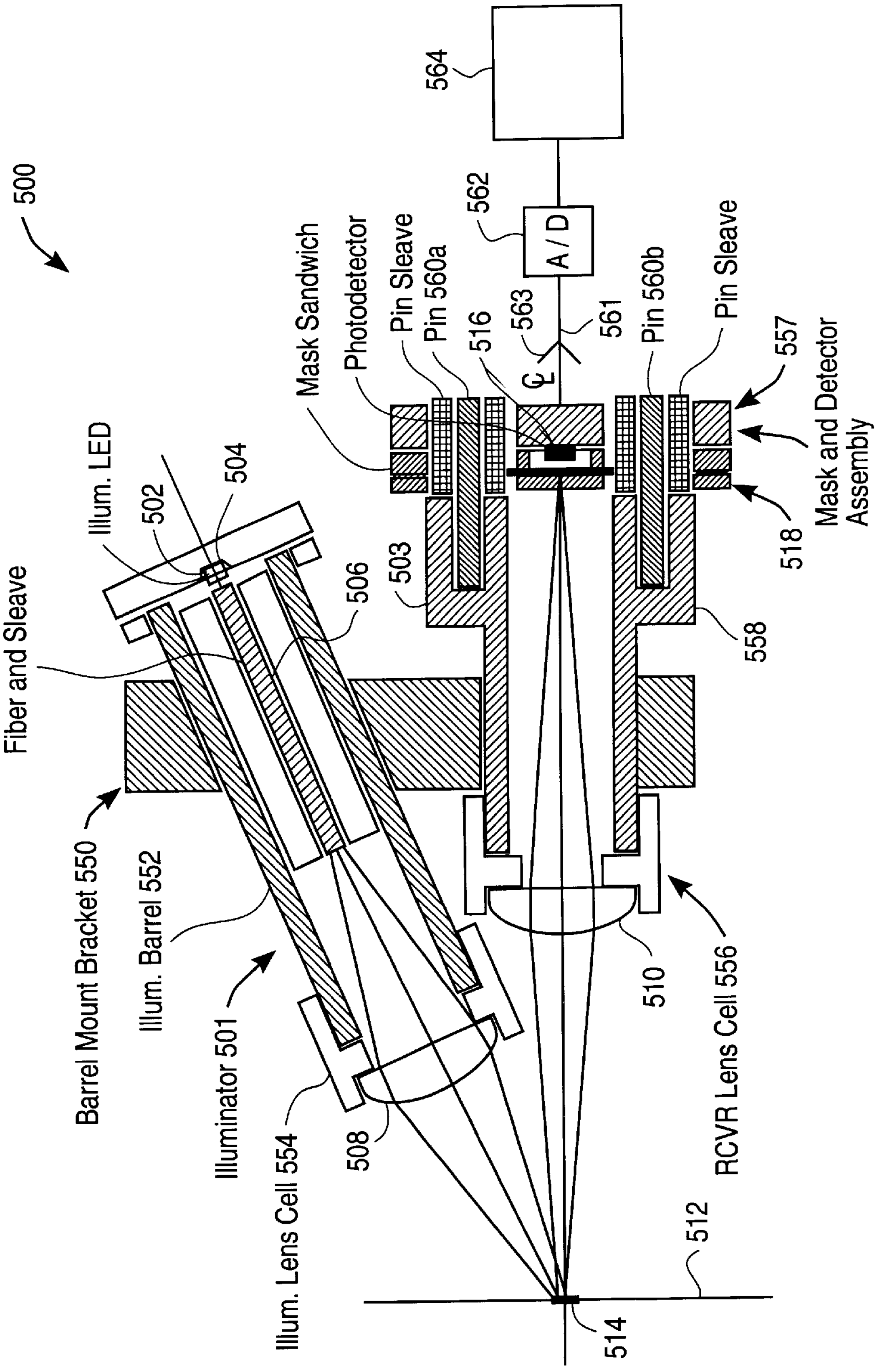
FIG. 1 is a diagram illustrating an exemplary spot detector according to the present invention.

The preferred embodiment of the present invention will be described in terms of a color ink jet printer that has multiple colors of ink, for example 3 colors. A microprocessor in the printer determines where to place spots of each color on a print medium, such as a piece of paper. In the preferred embodiment, all spots of a first color in the entire image will be printed before moving on to subsequent colors. For each spot to be printed, a microprocessor in the printer will calculate X and Y coordinates for the spot. The Y coordinate will be used to control a mechanism that moves the paper in the Y direction, while the X coordinate will be used to move a print carriage in the X direction. For a given set of X, Y coordinates, the paper will be moved so that the appropriate Y location on the paper is under the print carriage and the print carriage will be moved so that a print head is above the appropriate X location on the paper. When the print head is above the correct X, Y position on the paper, a spot of ink is generated by the print head. A first pass is made over the paper printing all spots of the first color, followed by subsequent passes to print spots in the other colors. During subsequent passes, spots printed in previous passes will be located prior to or during the subsequent passes to verify the precise location of the print head relative to the paper. There may be a number of spots throughout the page of paper that are detected in this manner. And these spots could be a part of the image, or they could simply be reference spots added just for alignment purposes. The reference spots can be made small enough to not be noticeable to a person looking at the image. This alignment function is important because there may be slippage of the paper during and in between passes. If this slippage is not detected and adjusted for, the multiple colors will be offset from one another, causing a defocused, staggered appearance.

When detecting a reference spot, the paper is moved so that the appropriate Y location on the paper is placed underneath the print carriage. In the preferred embodiment, the spot sensor is mounted to and moves with the print carriage. Thus, the appropriate Y location on the paper is also under the spot sensor. The print carriage is then moved in the X direction so that the ink spot passes under the spot sensor. Signal information from the spot sensor is correlated with information regarding the Y positioning of the paper, the X positioning of the carriage, and the velocity of the carriage to determine the precise position of the print head relative to the spot on the paper. If the velocity of the carriage is not provided by the microprocessor, then it can be calculated from multiple values for the X positioning of the carriage and the elapsed time between the multiple values. The microprocessor in the printer can then make adjustments for any discrepancy between the anticipated location of the spot and the actual location. A person of skill in the art will appreciate that various aspects of the invention can be adjusted depending on the precision required for the printing and the precision of the mechanisms that move the paper and the print carriage. For example, if the moving mechanisms are relatively less precise or the printing must be more precise, than the number of reference spots may be increased, the area detected by the spot sensor may be increased, etc.

Turning now to the drawings, and with particular attention to FIG. 1, a diagram illustrating a spot detector 500 for use in an ink jet printer according to an embodiment of the present invention is shown. The spot detector 500 is configured to detect a size and location of a spot 514 on the surface of a copy medium 512 as the copy medium 512 and the spot detector 500 move relative to one another within the printer. Typically, the copy medium 512 may be paper, transparencies, envelopes, labels or virtually any medium that can be printed on by an ink jet powder. It is noted that, while described in the context of ink jet printing, the present spot detector may be employed in a variety of other applications, such as printed circuit fabrication. Thus, the figures are exemplary only.

The spot detector 500 includes an illuminator 501 and a receiver 503. The illuminator 501 is configured to project a beam of light onto the surface of the copy medium 512. The reflected light is detected by the receiver 503. Since the intensity of the reflected light is dependent upon the uniformity of the surface of the copy medium 512, the receiver can identify the size and location of any spots 514 on the surface of the copy medium 512, as will be described in greater detail below.

Briefly, the spot detector 500 may include a barrel mount bracket 550 for mounting the illuminator 501 and the receiver 503 at predetermined angles relative to the copy medium. The barrel mount bracket 550 is adapted to carry an illuminator barrel 552, for example, at an angle (for example, 23 degrees) from the receiver. The receiver 503 is carried by a receiver barrel 558 which, in turn, is carried by the barrel mount bracket. The receiver barrel is adapted to carry the receiver components so that the receive optical path is at a predetermined angle relative to the copy medium, for example 90 degrees.

An illuminator lens 508 is mounted to the illuminator barrel 552 by an illuminator lens cell 554. As illustrated, the illuminator lens 508 is mounted at an end of the illuminator barrel proximate to the surface of the copy medium 512. However, other embodiments may have the illuminator lens 508 mounted in different positions in the illuminator barrel 552. In addition, it is noted that, while illustrated as a single lens, the illuminator lens 508 may include a multiple lens system, including one or more cemented lenses. For example, the illuminator lens 508 may be a doublet having four surfaces and transmission of 0.8. Alternatively, an aspheric lens having an F number of about 2.0 may be employed.

An illuminator light emitting diode (LED) 504 is positioned within a die cup 502 and mounted on the illuminator barrel 552 at an opposite end of the illuminator barrel 552. The die cup 502 provides improved coupling efficiency by concentrating the LED energy into a decreased cone angle. In one embodiment, the illuminator LED 504 is a 660 nanometer red LED having 10 milliwatts of total power. The die cup 502 may have a diameter of approximately 1 mm. The diode system is such that after epoxy potting, 6.5 milliwatts of available output are available. It is noted that the positioning of the illuminator LED 504 may vary relative to the illuminator lens 508, but in one embodiment, the illuminator LED 504 is placed at twice the focal length of the illuminator lens 508 to allow 1:1 re-imaging onto the surface of the copy medium 512. Thus, the energy collected is imaged onto a spot approximately the same size as the die cup 502. It is noted that performance may be varied through changing the diameter and depth of the die cup 502, as well as providing different lenses (for example, an aspheric lens having 2:1 demagnification, or varying the F number of the lens).

A fiber optic integrator 506 may be provided interposed between the illuminator LED 504 and the illuminator lens 508. The fiber optic integrator 506 may have a diameter of approximately 1 mm and an F number of approximately 0.8. The fiber optic integrator is provided to homogenize the projected spot. The fiber optic integrator 506 thus creates a more uniform source which is re-imaged onto the surface of the copy medium 512. It is noted that other embodiments may not employ a fiber optic integrator, and have less uniformity but less path loss For color operation (i.e., detection of color spots), the illuminator can include two or three LEDs of different wavelengths to discriminate the color of the printed spot. If the color of the printed spot is known before scanning, the appropriate LED to discriminate the ink color can be selected.

The receiver 503 includes a receiver barrel 558 for mounting the receiver components. The receiver barrel 558 may be positioned roughly perpendicularly to the surface of the copy medium 512. In particular, a receiver lens 510 may be mounted on the receiver barrel 558 by a receiver lens cell 556. As illustrated, the receiver lens 510 is mounted at an end of the receiver barrel 558 proximate to the surface of the copy medium 512. However, other embodiments may have the receiver lens 510 mounted in different positions in the receiver barrel 558. In addition, it is noted that, while illustrated as a single lens, the receiver lens 510 may include a multiple lens system, including one or more cemented lenses. For example, the receiver lens 510 may be a doublet having four surfaces, a transmission of about 0.8 and an F number of about 5.0. A lens with a relatively high F number is employed to ensure adequate image quality over a broad depth of field.

The receiver lens 510 projects the image of the illuminated region onto a photodetector 516, which is mounted on a mask and detector assembly 557. The mask and detector assembly 557 is mounted on the receiver barrel 558 via pins 560*a*, 560*b* at an end opposite to the receiver lens 510. Again, the photodetector 516 and the receiver lens 510 may be positioned differently relative to the receiver barrel 558. A mask 518 interposed between the photodetector 516 and the receiver lens 510 is patterned to convert the image on the detector surface into variations in optical signal strength. As will be discussed in greater detail below, timing and changes in signal intensity reflect both the location and size of the scanned spot. The photodetector 516, which may be a photodiode, converts the optical signal into an electric current. As will be discussed in greater detail below, the behavior of the modulated current is dependent upon the Y-axis position of the spot, the scan velocity of the printer head, the intensity uniformity of the illumination on the copy medium and the pattern on the mask.

The photodetector 516 is coupled to a processing unit 564, which will be discussed in greater detail below.

As discussed above, the mask 518 is provided to convert the spatial intensity variations of the moving spot image into a modulation of optical signal strength. A pattern is provided on the mask 518 to encode a specific output signal signature as the spot 514 moves through the pattern. Different signal patterns are developed, depending upon the size of the spot 514 and the path through which the spot 514 moves.

Figure 2:
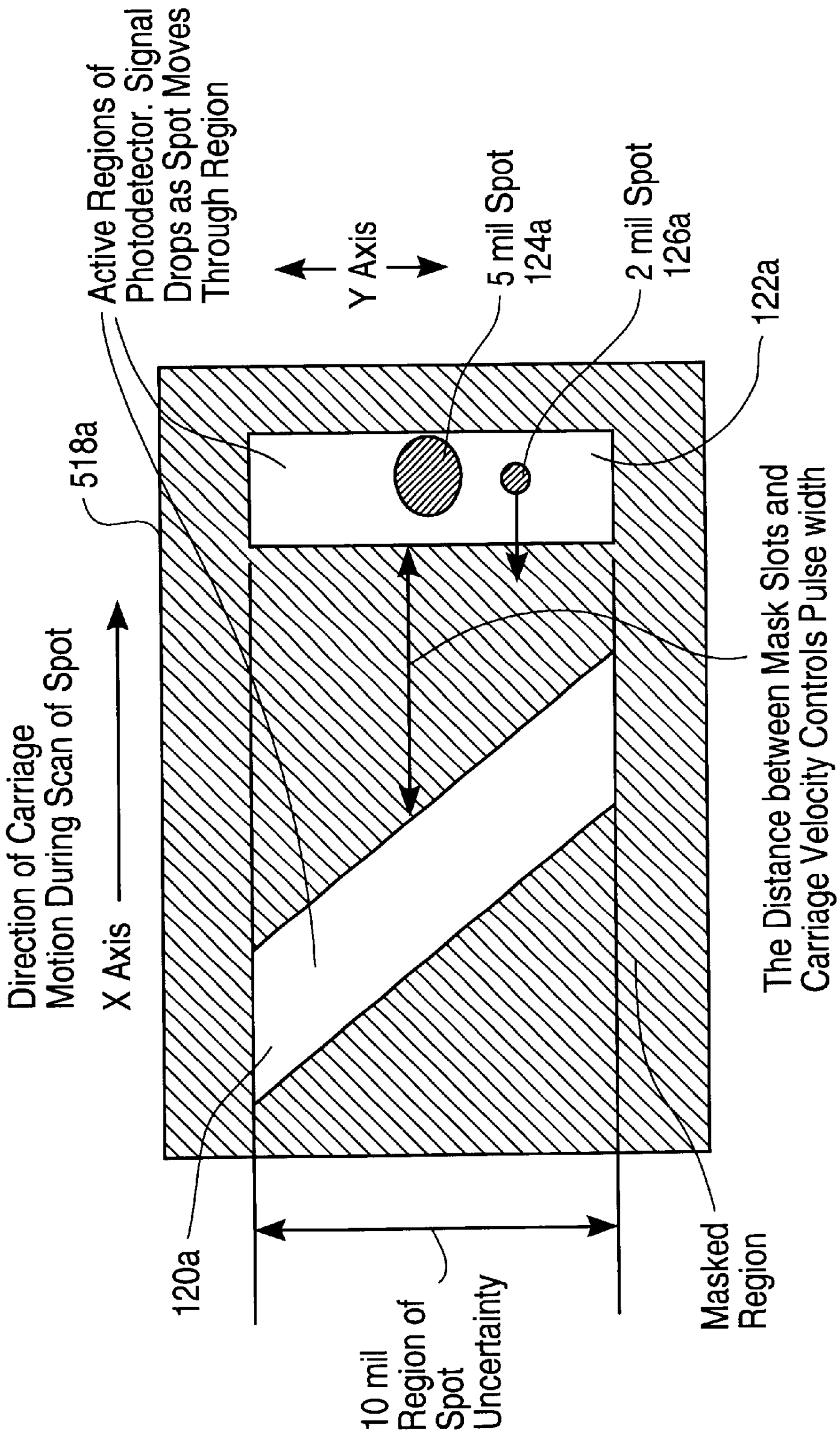
FIG. 2 illustrates an exemplary optical mask pattern according to an embodiment of the present invention.

An exemplary mask pattern is illustrated in FIG. 2. As illustrated, the mask 518*a* includes a pair of apertures, 120*a*, 122*a* defining active regions (i.e., signal strength changes as the spots move through the regions). Exemplary spots 124*a*, 126*a* move from right to left across the mask 518*a*. As illustrated, the mask apertures 120*a*, 122*a* have a length of about 10 mils in the vertical (Y) direction, although different sized apertures may be employed. The aperture 122*a* is configured to be roughly perpendicular to the direction of spot movement. The aperture 120*a* is angled from the direction of movement.

Figure 5:
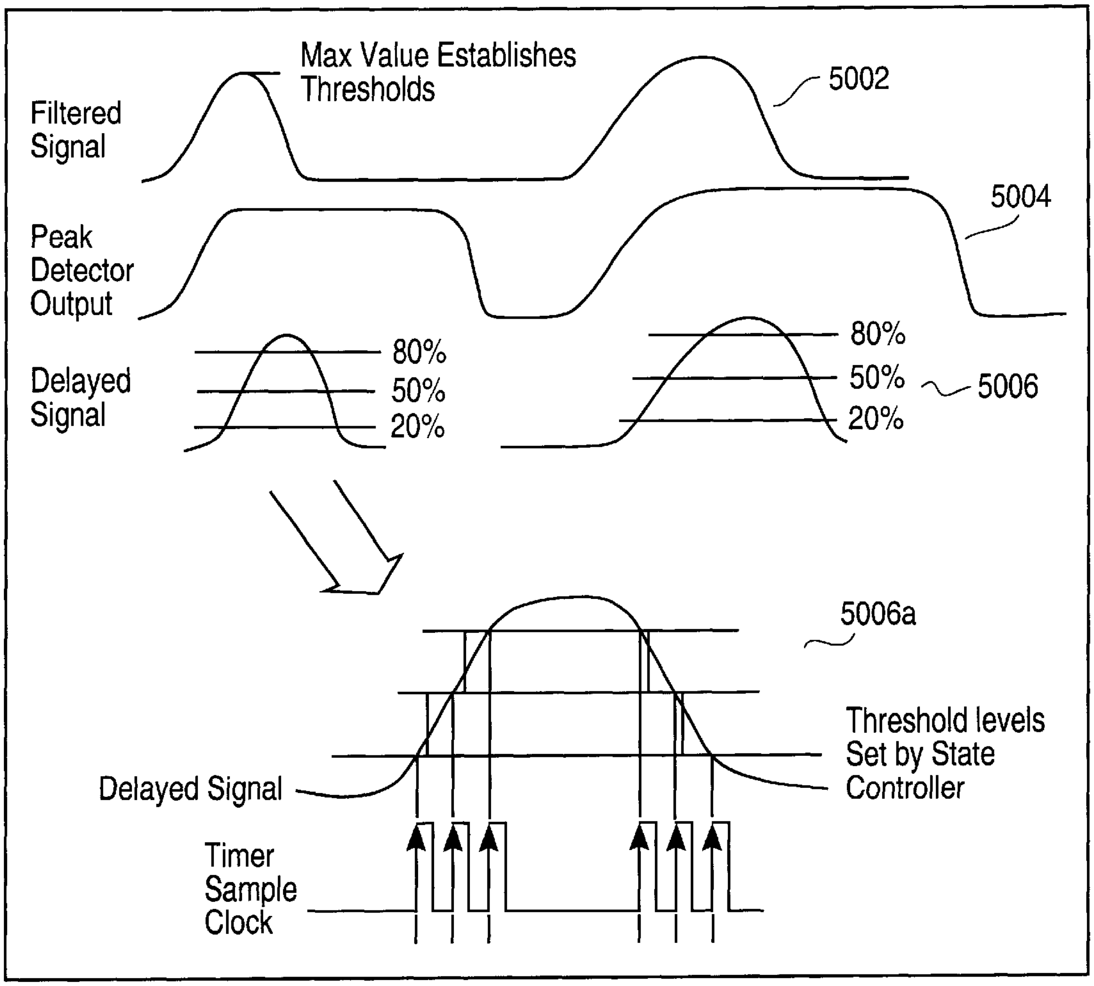
FIG. 5 illustrates various signals of use according to the present invention.

Turning briefly to FIG. 5, the spot detector 500, and more particularly the photodetector 516, generates an electronic signal that is generally similar to the signal 5002 illustrated in FIG. 5, when the reflected image of the ink spot passes through the mask 518. The first pulse in the signal 5002 results from the image of the spot passing through the mask aperture 122*a* and the second pulse in the signal 5002 results from the image passing through the mask aperture 120*a*. The actual X position of the spot relative to the expected X position is determined by comparing the timing of the first pulse in the signal 5002 with the encoded X position values received from a head carriage encoder. Interpolation may be used between multiple X position values to determine a more precise head carriage location, if desired. The actual Y position of the spot relative to the expected Y position is determined by evaluating the time span between the two pulses in the signal 5002. For a given head carriage speed, the time span between the pulses will be larger if the spot is further up the Y axis illustrated in FIG. 2.

Figure 3:
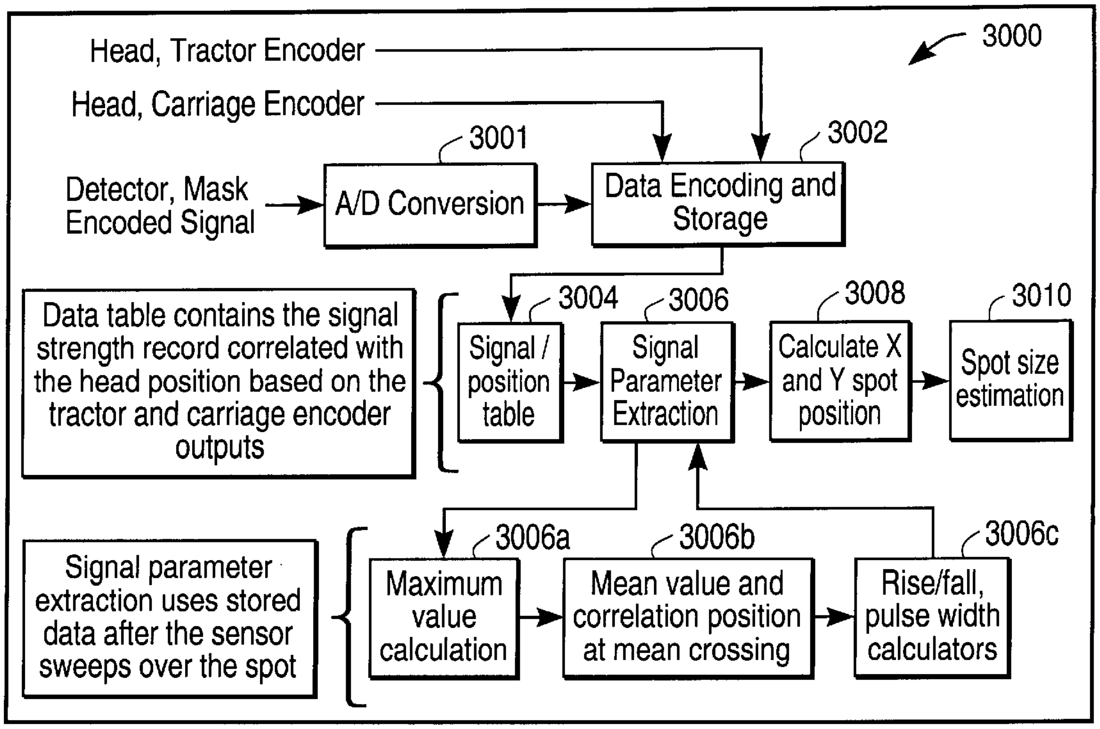
FIG. 3 illustrates signal acquisition and processing logic according to an embodiment of the invention.

Turning now to FIG. 3, a diagram illustrating a data acquisition and processing system 3000, such as the processing unit 564, according to an embodiment of the present invention is illustrated. The process shown is based on sensor signal digitization followed by digital processing. The use of the digitized signal allows the extraction of peak signal values in addition to the crossing times, to allow the extraction of shape and orientation information on the spot. Signal crossing points are processed in order to calculate spot position and size as will be discussed in greater detail below. In particular, inputs are received from a known head tractor encoder and head carriage encoder (not shown) to a data encoding and storage unit 3002. The head tractor and the head carriage information is used, for example, to determine carriage speed and position. In addition, the mask detector signal is provided to an A/D converter 3001 prior to being provided to the data encoding and storage unit 3002. The output from the data encoding and storage unit 3002 is provided to a signal position table 3004. The signal position table 3004 contains the signal strength record correlated with the head position based on the tractor and carriage encoder outputs. The outputs from the signal position table 3004 are then provided to a signal parameter extraction unit 3006. The signal parameter extraction unit 3006 uses the stored data after the sensor has swept over the ink spot. In particular, the signal parameter extraction unit 3006 performs a maximum value calculation 3006*a*, determines a mean value and correlated position at mean crossings 3006*b*, and determines rise/fall pulse width calculations 3006*c*. From these calculations, the X and Y positions of the ink spot may be determined by calculation unit 3008. Finally, the spot size may be estimated by unit 3010, as will be discussed in greater detail below.

Figure 4:
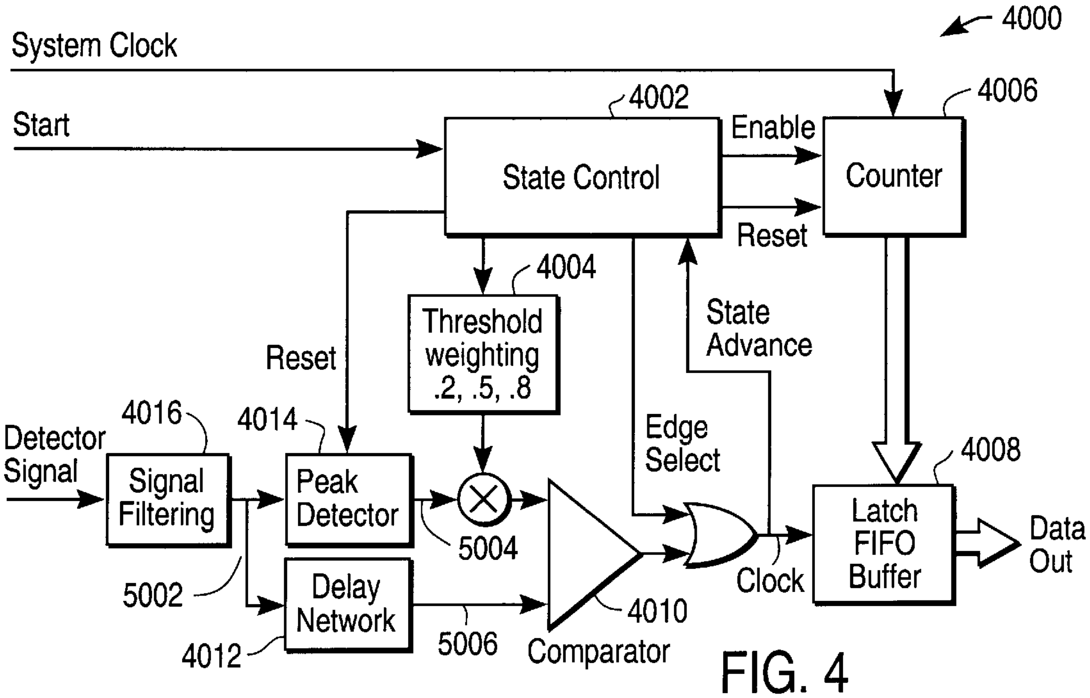
FIG. 4 illustrates signal acquisition and processing logic according to an alternate embodiment of the invention.

An alternate embodiment of a data acquisition and processing system 4000 is illustrated in FIG. 4. The embodiment of FIG. 4 processes the signal data in the sensor head to extract the signal crossing times which are subsequently passed to the printer controller. The embodiment of FIG. 4 is suitable for applications where a dedicated A/D converter is not appropriate. Again, however, signal crossing points are processed to calculate spot position and size. Briefly, the embodiment of FIG. 4 may employ a custom processing ASIC (application specific integrated circuit) to eliminate the need for a dedicated A/D converter to repetitively sample the signal. The ASIC stores threshold crossing times of the pair of signal pulses and passes these times to the printer during or after the spot scan. Analog processing samples the peak value of each pulse to establish a maximum reference value which is scaled to establish a series of thresholds relative to a delayed signal waveform. The embodiment uses a state machine which simply successively steps through the threshold levels rather than having multiple comparators at each crossing level.

The timing diagram shown in FIG. 5 illustrates a representative waveform resulting from the ink spot moving through the mask. Turning back to FIG. 4, the input signal is filtered in a signal filtering unit 4016 to limit the detection bandwidth to meet the fastest rate of change expected during the spot scan. The output of the signal filtering unit 4016 is the signal 5002. Following the input filter, the peak detector 4014 samples the maximum value of each pulse and holds it through the duration of the signal pulse. At the completion of each pulse, the peak detector is reset, allowing it to sample the next mask opening spot crossing. The peak detector output is shown as signal 5004.

The maximum value peak detector output is used to establish a series of comparison reference levels which are progressively scaled by the factors 0.2, 0.5 and 0.8 to set the desired 20%, 50% and 80% threshold crossing levels by threshold weighting unit 4004. In parallel with the peak detector, a network delay 4012 delays the incoming detector signal by half the maximum pulse width duration to allow the sampling of the signal peak prior to the leading edge of the delayed signal crossing the first 20% level. The delay can be provided by conventional active filter-based all pass network or through the use of a switched capacitor network. The output from the delay network is signal 5006. As the signal crosses each threshold level, a positive going edge clock samples the value of the system clock timer. This timer value is processed in the printer controller with the position feedback that the scanner had at the time of the crossings. Adjustments for signal propagation delays may be desired.

The X and Y position determination is based on the estimation of the position where the mask opening overlays the ink spot in relation to information regarding the position of the print head. Assuming a constant head velocity over the region where the spot is located, the maximum signal will occur when the spot is centered within the mask opening and the peak will be centered between the 50% crossing points on the leading and falling edges. While half maximum detection on one edge may be used to resolve both the X and Y components in the ink spot in the determination of the X axis location, the use of half maximum detection on only the rising edge introduces an estimation bias dependent on the size and radial distribution of the spot. However, using both edges eliminates this bias error and improves estimation uncertainty by a $\sqrt{2}$ factor by averaging the position uncertainty of two edges rather than one. Since the Y position is based on the relative difference between crossings rather than a single point, this bias error does not occur for the Y position determination. However, the Y axis spot position estimation also benefits from the estimation accuracy improvement resulting from using two pulse edges in the position calculation.

Determination of spot size is more difficult than spot position. Ideally, the peak value of the reflected signal should be correlated to the size of the spot and the contrast between the paper ink absorption. Unfortunately, the shape of the spot may not be uniform and the reflective characteristics of the paper may not be known so other information must be gained from the scanning data. In addition to the crossing time of the spot in the mask opening, information may also be obtained from the rise and fall times, pulse width and peak signal from the vertical and inclined portions of the mask. In the case of a circular ink spot, the signal response to the vertical and inclined portions of the mask are correlated. As long as the spot passes through the slot away from the edges of the mask opening, the spot passing through the inclined portion will appear to travel slower through the slit than with the vertical portion. This produces an increased rise/fall time and pulse width proportional to the cosine of the slit angle relative to vertical, for all spot sizes.

If the spot is not uniform, i.e., deviates from circular, and it is comparable in size to the slot width, the peak signal will be different between the slot crossing signals. The rise and fall time, and to a lesser extent pulse width, are correlated to the radial distribution of spot intensity at the mask plane. When the spot is smaller than the slit, the half width pulse width remains constant at the slit width. When the pulse diameter is comparable or larger than the slot width, the normalized pulse width increases. The rise time generally follows the spot diameter until the spot diameter is larger than the slit opening. At larger spot diameters, the rise time response rolls off.

Figure 6A:
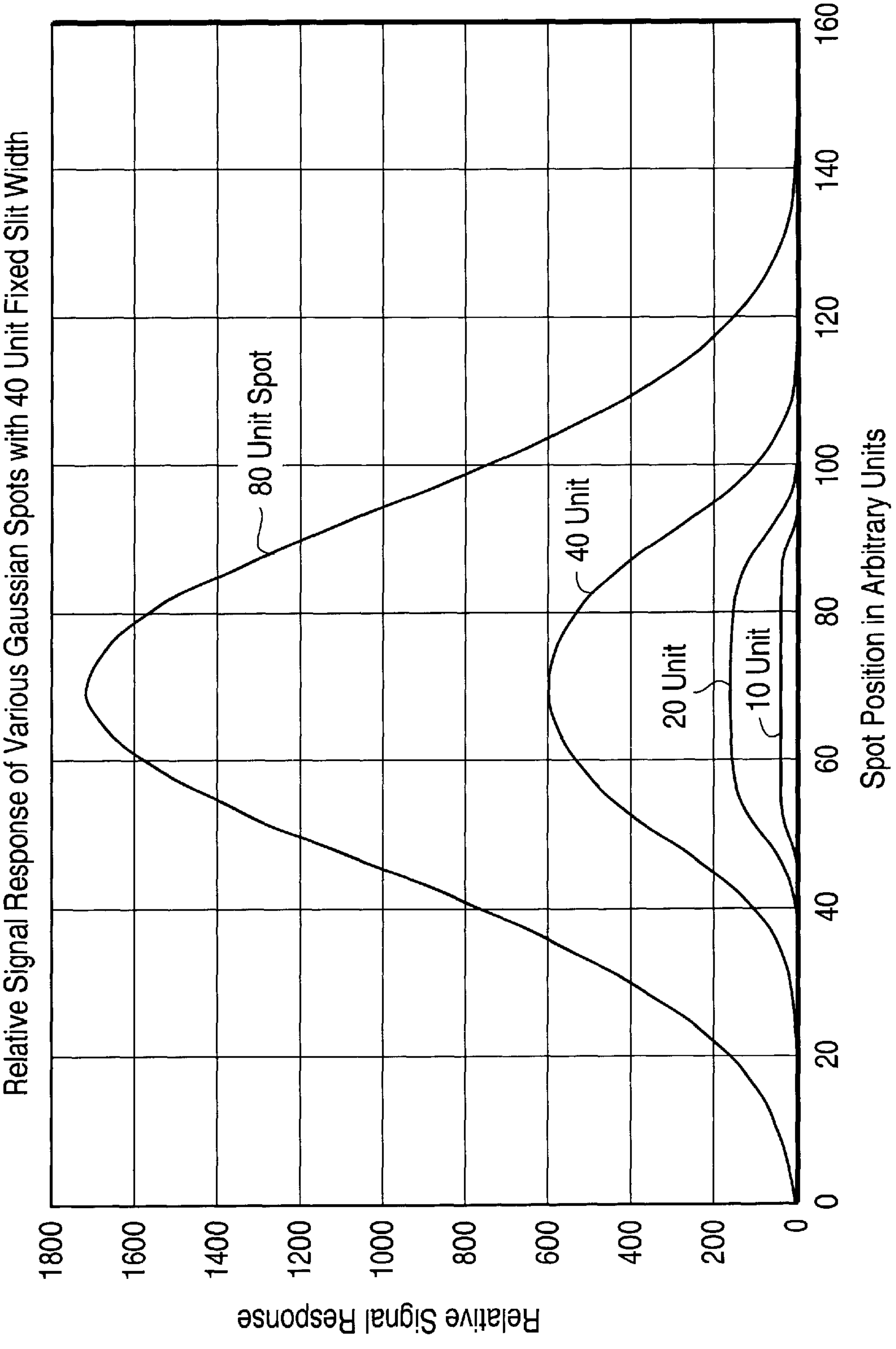
FIGS. 6A–6B illustrate relative signal responses for various gaussian and pill spots.
Figure 6B:
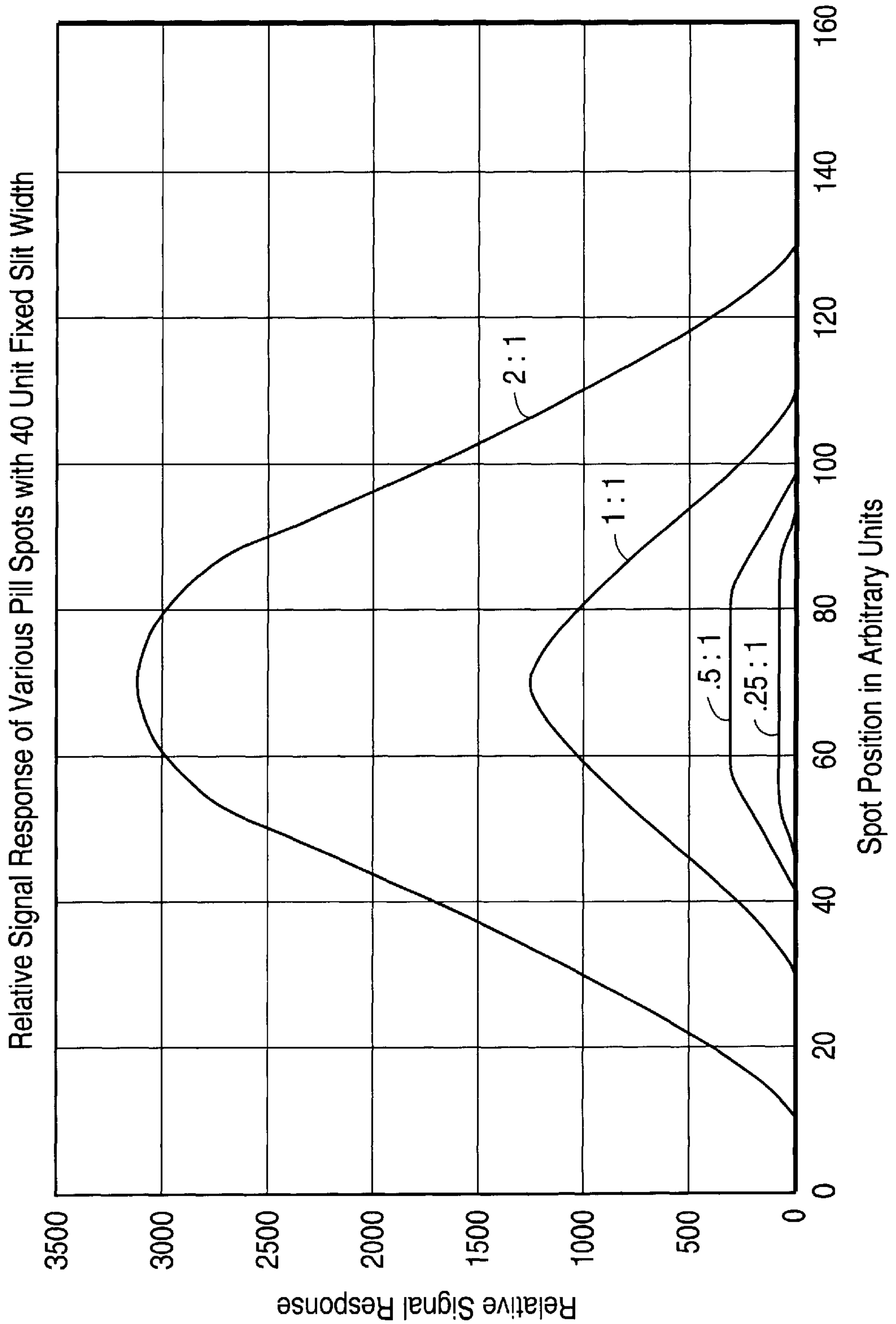
Figure 7:
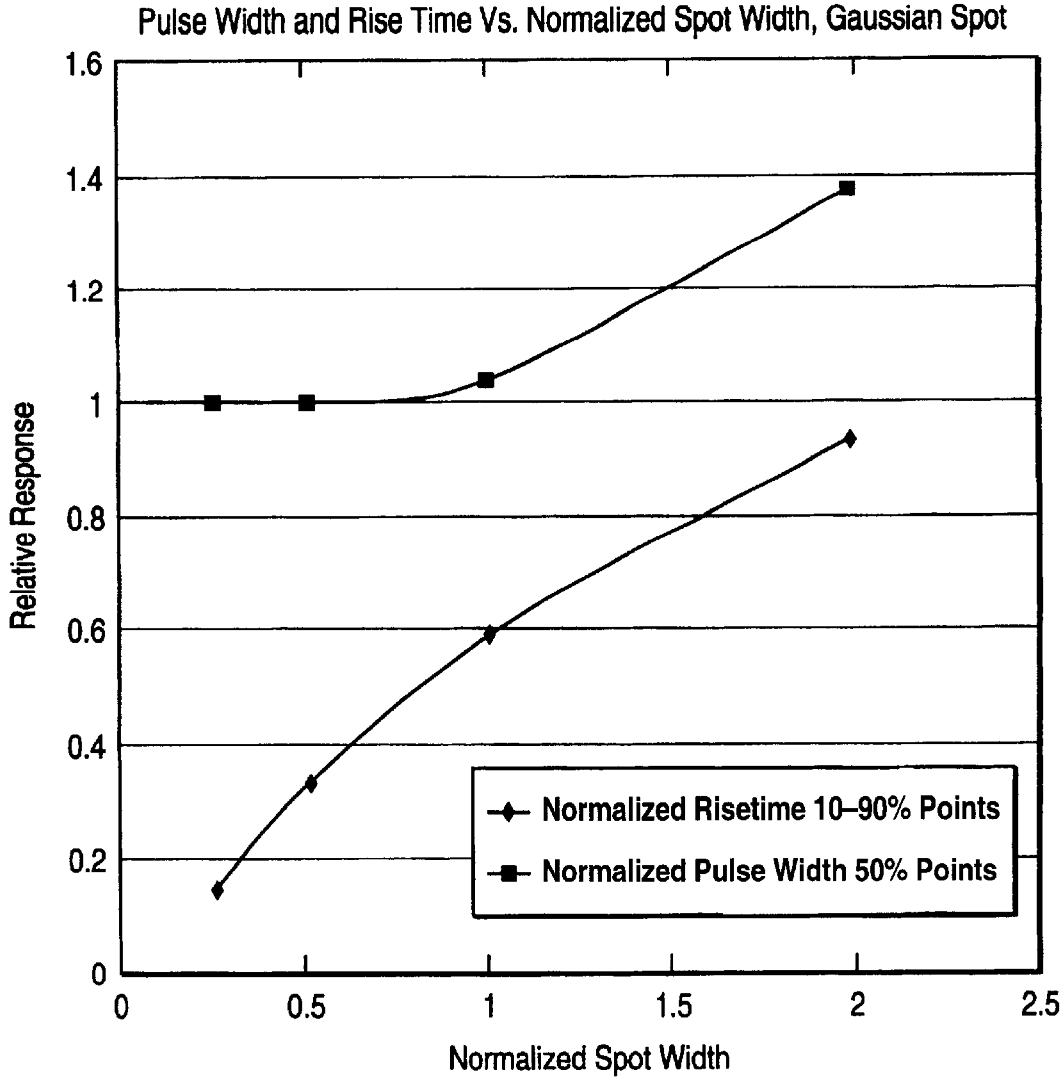
FIG. 7 illustrates pulse width and rise time versus normalized spot width.
Figure 8:
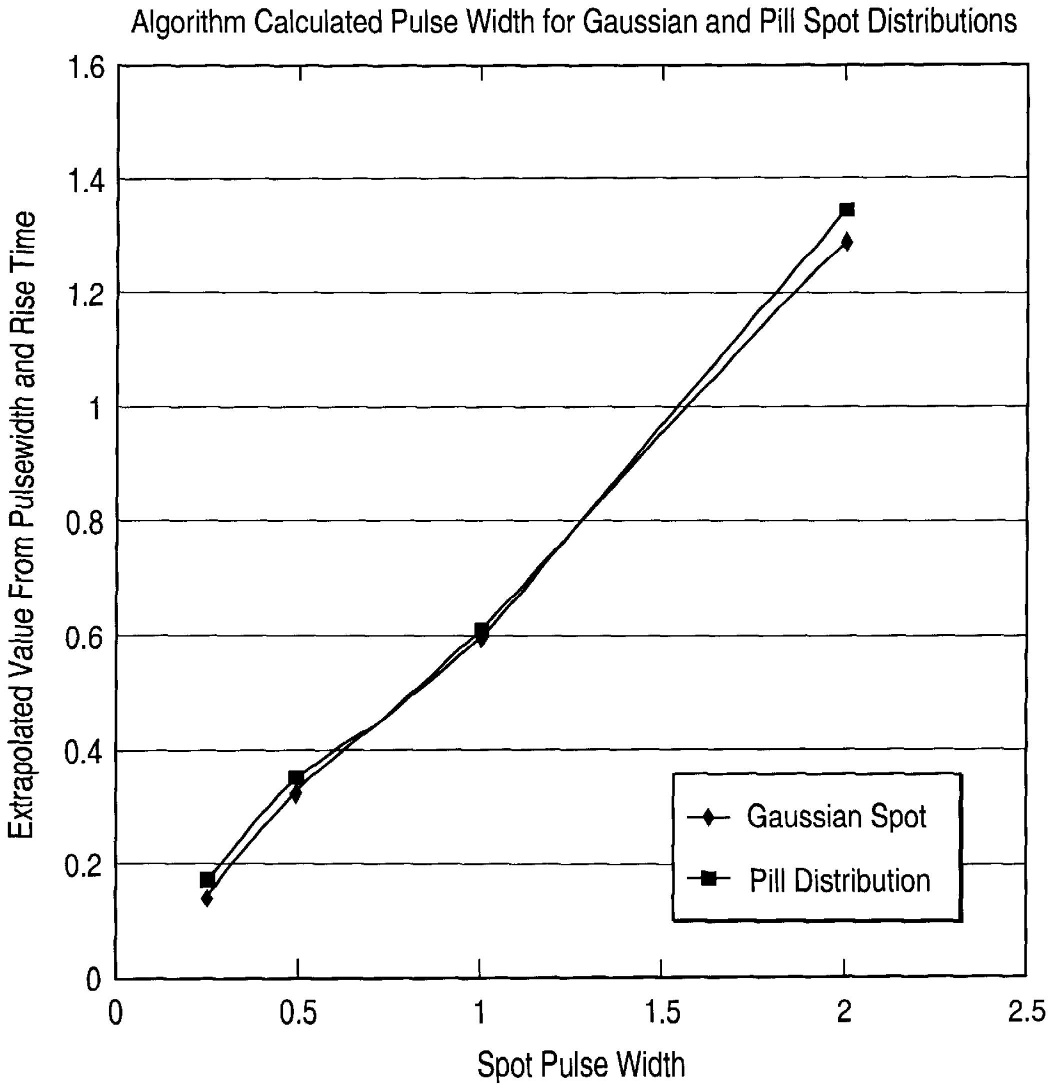
FIG. 8 is a comparison of pulse width for gaussian and pill spots.

FIGS. 6A and 6B illustrate relative signal response for various gaussian and pill spots, respectively. As can be seen, the responses for similarly-sized spots are similar. FIG. 7 illustrates a graph of pulse width and rise time versus normalized spot width for gaussian spot, i.e., a circular spot with a gaussian radial distribution. The simulation occurs against a fixed slit opening. Four spots with increasing diameters are passed across the opening and the rise time and pulse width are calculated from the normalized pulse response. All parameters are normalized to the slit width. As shown in FIG. 7, when the spot is smaller than the slit the half-width (50% points) pulse width remains constant at the slit width. When the spot diameter is comparable or larger than the slot width, the normalized pulse width increases. The rise time generally follows the spot diameter until the spot diameter is larger than the slit opening. At large spot diameters, the rise time response falls off. As shown in FIG. 8, both gaussian and pill function radial spot distributions result in generally similar signal outputs. In particular, FIG. 8 shows the results taking the product of the rise time and pulse width and plotting the result versus a spot diameter.

When a circular spot passes through a second inclined slit, the pulse width and rise time are proportional to the responses of the first slit by a one over cosine theta factor where theta is the angle of offset. The peak signal response is equal to the first response.

Figure 9A:
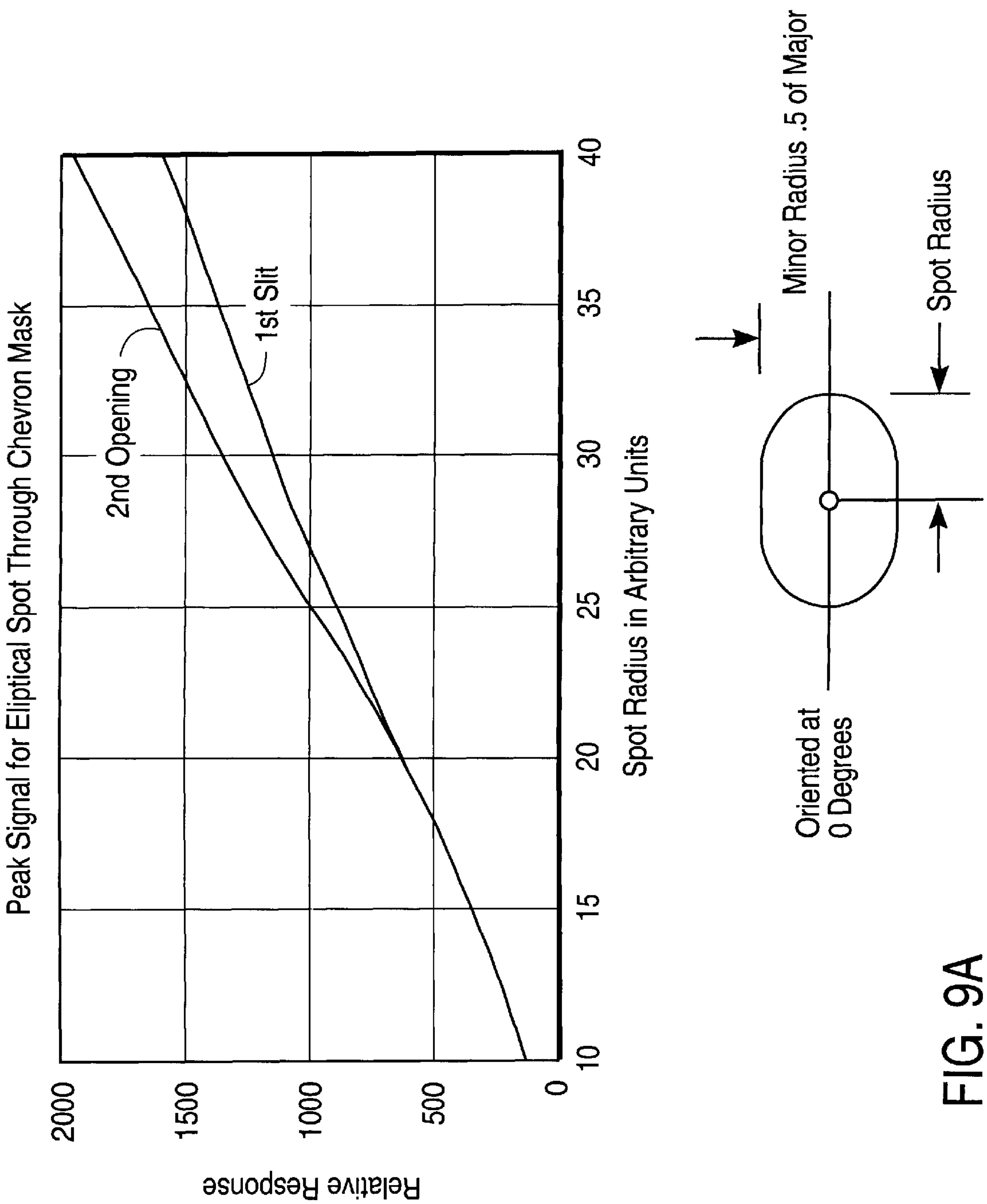
FIGS. 9A–9B illustrate peak signals for elliptical spots.
Figure 9B:
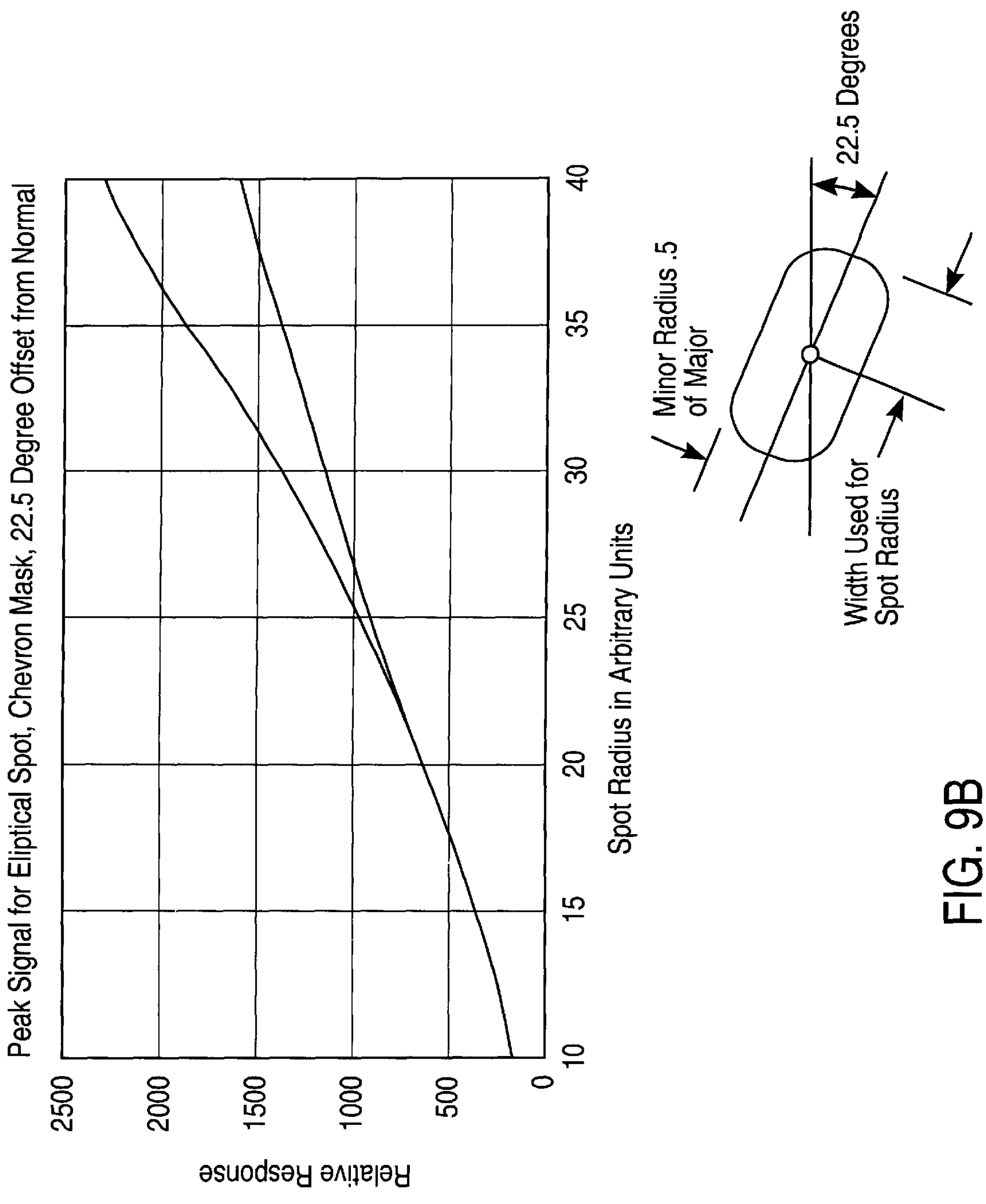

In the case of an elliptical pulse shape, the response of the second slit is no longer proportional to the first. The greater the degree of asymmetry, the larger the discrepancy. The orientation of the spot also affects the response. The effect on the peak signal difference is shown in FIGS. 9A–9B for an elliptical spot. As the spot width approaches the width of the slit, the response of the second, i.e., angled slit increases at a greater rate than the first. In the case of an angled elliptical pulse, as the spot width approaches the width of the slit, the response of the second slit increases more than when the pulse is not angled.

Thus, the product of the rise time and the pulse width can be used to approximate the spot size. In addition, the response of the second slit can be compared to the response of the first slit to determine whether the spot is more circular or more elliptical. If the responses are not proportional, then the spot is more elliptical and the spot size approximation may not be accurate. This condition can be reported to the printer microprocessor as a possible problem with the ink jet mechanism.

Figure 10A:
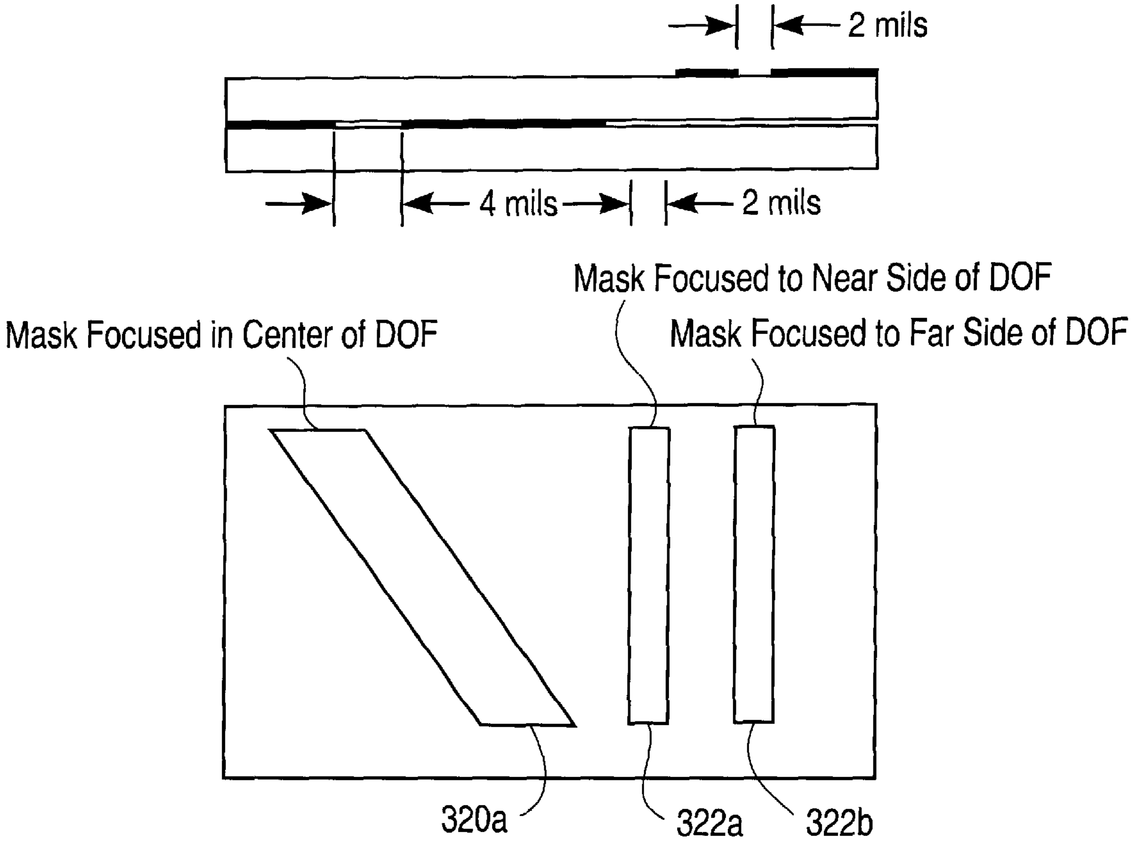
FIGS. 10A and 10B illustrate multi-layer masks according to embodiments of the present invention.
Figure 10B:
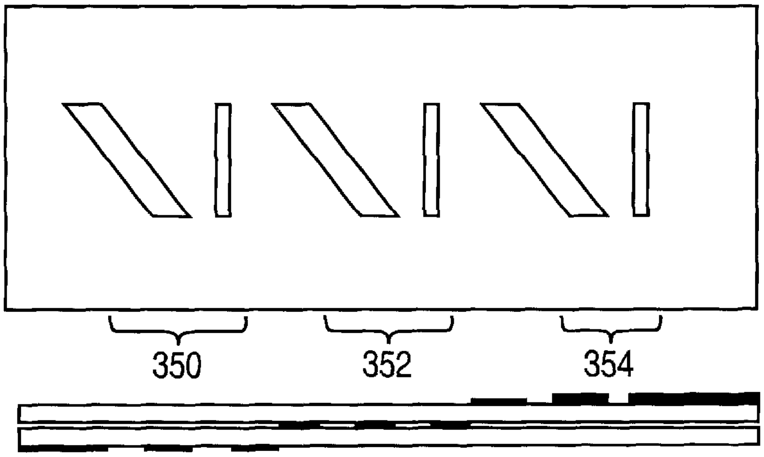

Turning now to FIGS. 10A and 10B, alternative embodiments of the mask are illustrated. Both the operating wavelengths and variations in the copy medium to lens operating distance cause movement of the point of best focus along the Z axis (perpendicular to the surface of the copy medium) at the mask image plane. This variation in focus leads to defocusing of the image and increasing the blur size. This effective image degradation of the depth of field can be reduced by changing the operating distance between the mask and the receiver lens as the operating distance to the surface of the copy medium is varied. As can be appreciated, this solution can be mechanically expensive and complex. Accordingly, according to an embodiment of the present invention, the optical working distance to a given mask opening is staggered by placing it on different (i.e., non-coplanar) mask substrate layers, such that different portions of the depth of field can be optimally resolved. FIG. 10A illustrates an exemplary multiple layer mask. Each opening 320*a*, 322*a*, 322*b* is at a different layer in the substrate. Aperture 320*a* is focused in the center of the depth of field; aperture 322*a* is focused at the near side of the depth of field; and aperture 322*b* is focused at the far side of the depth of field.

The layered mask effectively forms a series of spatial filters matched to regions over the depths of field. As the spot moves across the field, covered by the mask openings, a series of pulses are generated. If the spot is sufficiently small to be sensitive to degraded image quality, the pulse with the sharpest rise and fall transitions will indicate the mask openings placed at the point of best focus. Larger spots will yield relatively the same response at different openings.

In addition, color correction can be provided by using a modified staggered mask. The basic modified chevron pattern may be replicated on different mask layers, such that the variation in distance of the given layer reflects the effect of focal distance of the lens at a given wavelength. Thus, as illustrated in FIG. 10B, chevron pattern 350, 352, 354 each has a corresponding illuminated region of different wavelengths. Thus, the different LED outputs may be focused on different spots.

Figure 11A:
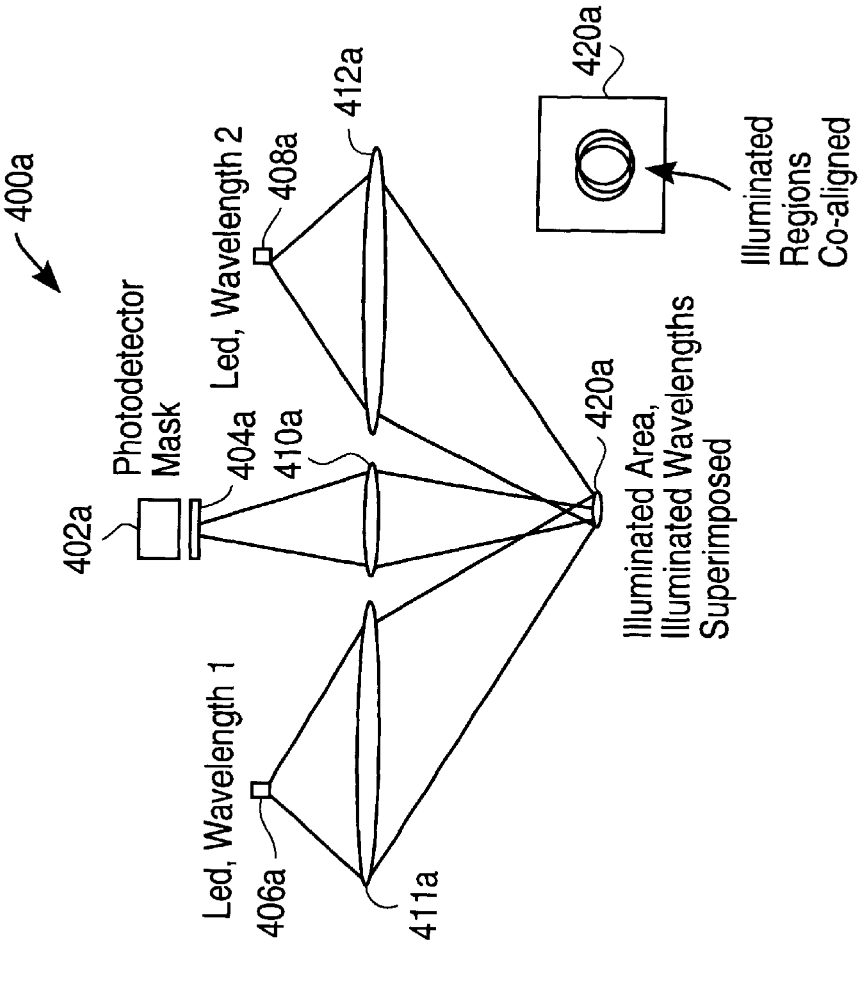
FIGS. 11A–11C illustrate exemplary optical configurations for spot detectors according to the present invention.
Figure 11B:
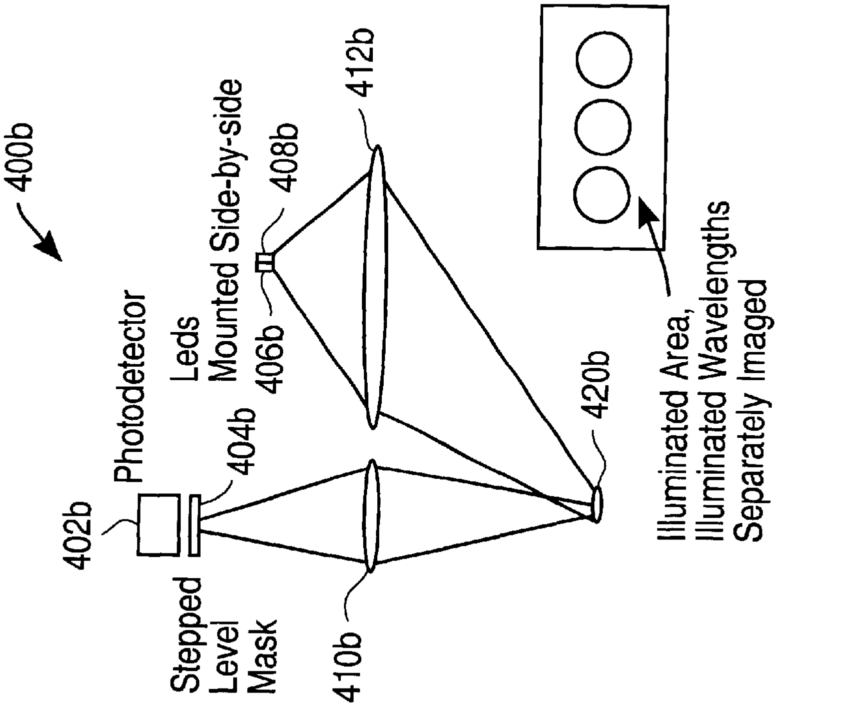
Figure 11C:
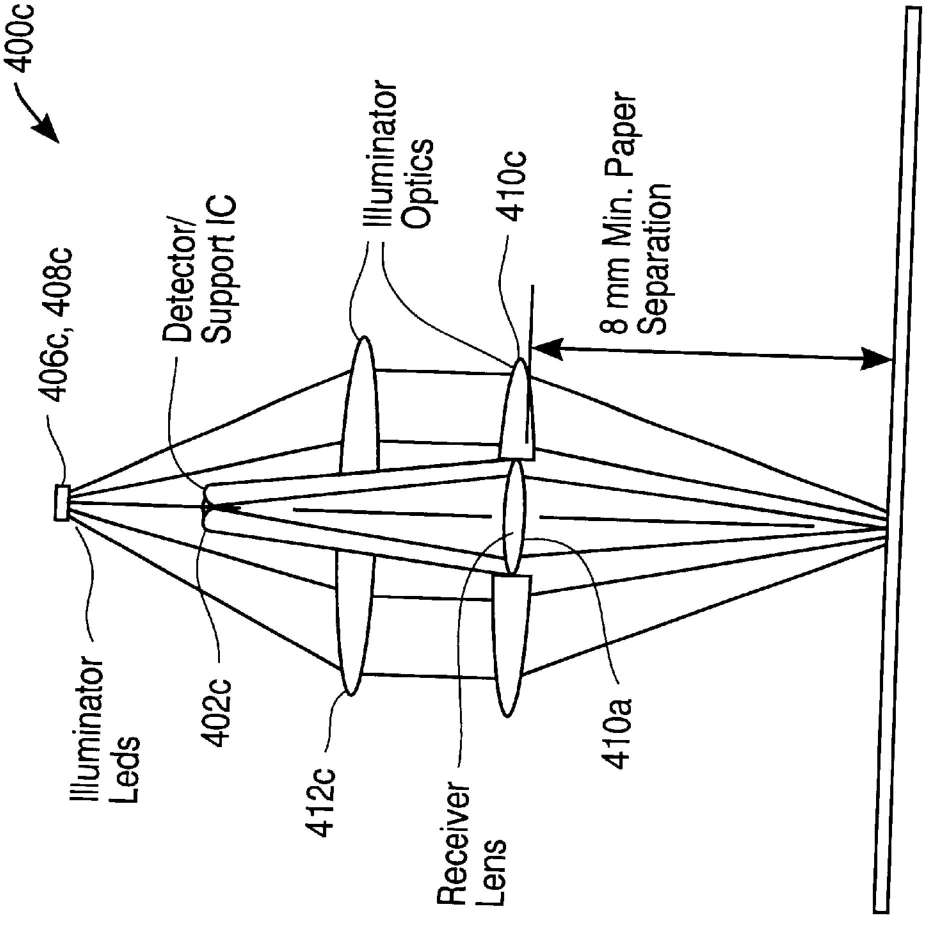

More particularly, turning now to FIGS. 11A–11C, various optical configurations for color spot illumination are illustrated. Turning now to FIG. 11A, a system 400*a* is shown in which the illuminated regions 420*a* for each wavelength are coaligned. More particularly, different wavelength (i.e., color) LEDs 406*a*, 408*a* are provided, with corresponding illuminator lenses 411*a*, 412*a*, respectively. To ensure a common area of illumination, the illuminator systems are mounted roughly symmetrically about the receiver system. A receiver including a photodetector 402*a*, a mask 404*a* and a receiver lens 410*a* are provided to receive the reflected signals.

FIG. 11B, on the other hand, illustrates a system in which separate illuminated regions are provided for each wavelength or color. Again, the receiver includes a photodetector 402*b*, a mask 404*b*, and a receiver lens 410*b*. The illuminator system, however, includes different wavelength LEDs 406*b*, 408*b* mounted side-by-side, with a single illuminator lens interposed between the LEDs 406*b*, 408*b* and the separate illumination regions 420*b* on the surface of the copy medium. In this embodiment, although there are separate illuminated regions for each color, only one is activated at a time. As the spot moves across each field, successive illumination zones are activated to prevent spots from outside the desired registration region from influencing the modulation signal resulting from the desired spot movement.

An alternate configuration is illustrated in FIG. 11C. As illustrated in FIG. 11C, the illuminator and detector systems are mounted coaxially. The illuminator LEDs 406*c*, 408*c* are mounted to project onto illuminator optics 412*c*, 410*c* and thereafter onto the spot on the surface of the copy medium. A detector 402*c* and associated support circuitry is mounted between the illuminator LEDs 406*c*, 408*c* and the surface of the copy medium. A receiver lens 410*a* is further interposed between the detector 402*c* and the surface of the copy medium. The receiver lens 410*a* receives the reflected illumination from the surface of the copy medium and projects it onto the detector. The configuration improves the intensity uniformity and the circularity of the illuminated region. The optics used for illumination employ a pair of spherical lenses with F numbers at approximately 1.0 to optimize throughput. The focal length of the lens is slightly longer than twice the receiver lens's F number. The LED die cup and support board are placed behind the detector IC.

Figure 12A:
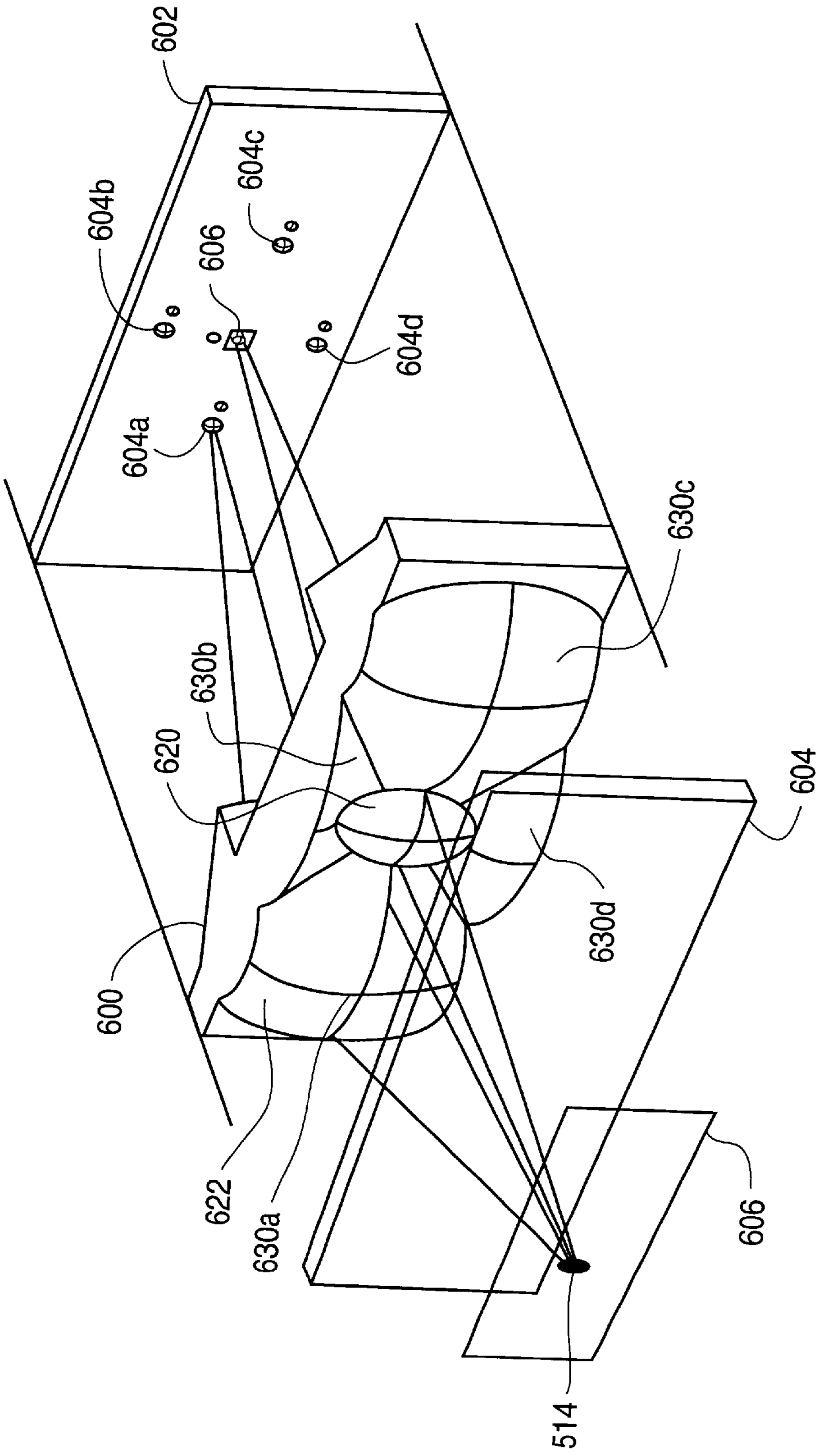
FIGS. 12A–12C illustrate an exemplary optical system for use according to the present invention.
Figure 12B:
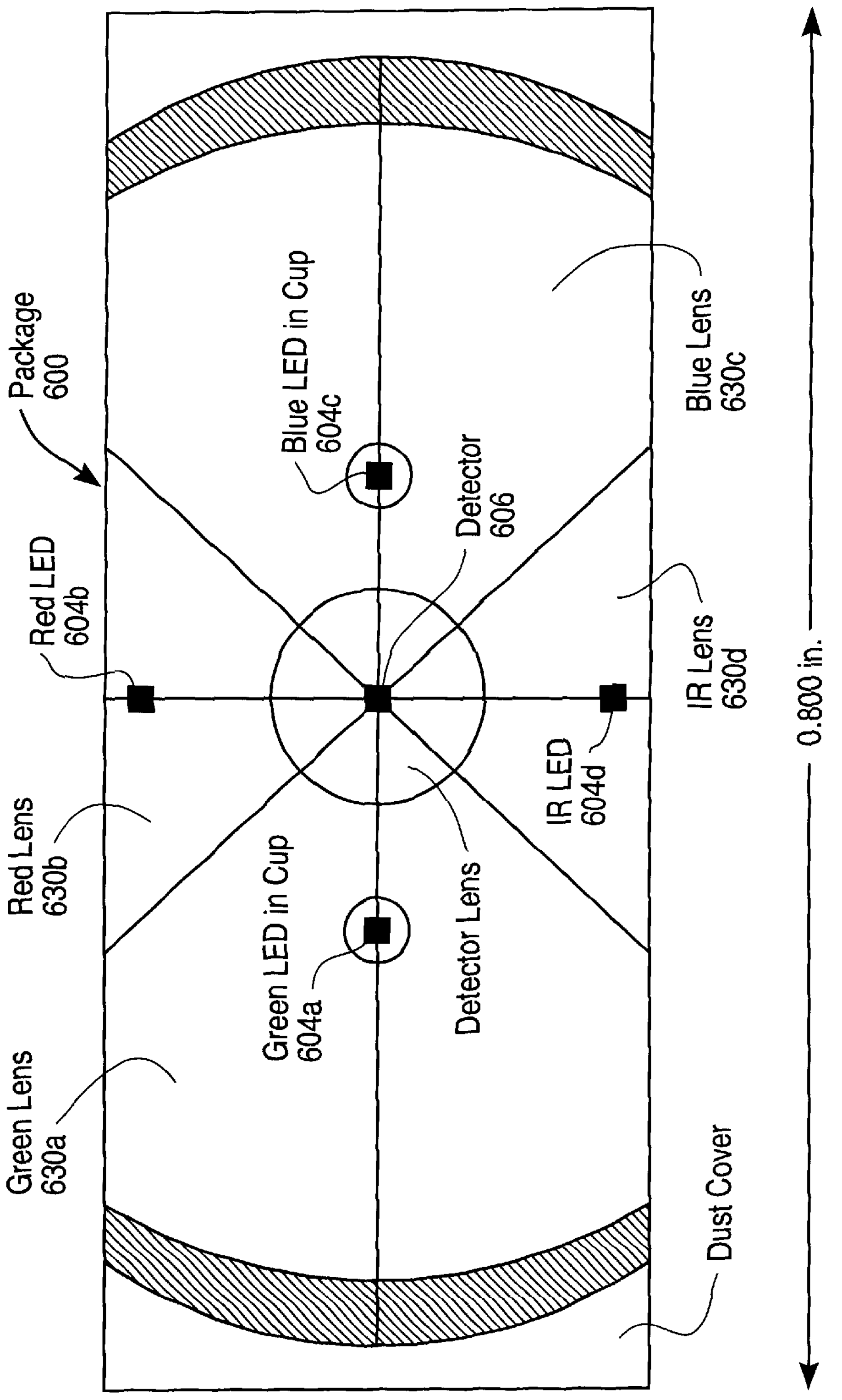
Figure 12C:
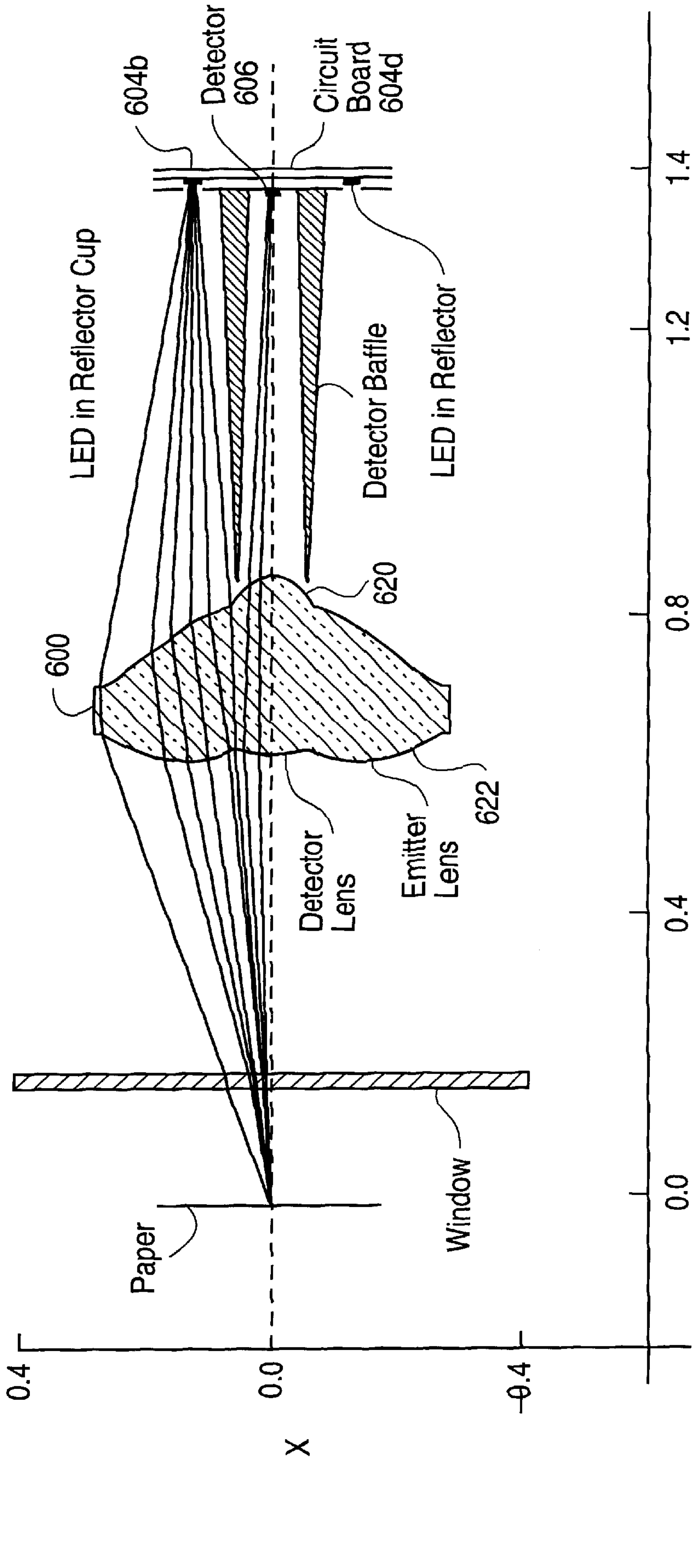

An exemplary lens 600 is shown in FIGS. 12A–12C. The lens includes a detector lens 620 and an illuminator lens 622. The lens 600 is mounted between a circuit board 602 and a window 608 which may include a mask as described above. A spot 514 is positioned on the medium 606 which is detected by the spot detector as described.

The circuit board 602 includes a plurality of LEDs 604*a*–604*d* and a detector 606. In one embodiment, the LED 604*a* is a green LED positioned in a die cup; LED 604*b* is a red LED; LED 604*c* is a blue LED positioned in a die cup; and LED 604*d* is an IR (infrared) LED. The LEDs 604*a*–604*d* project light through lens 600 onto the spot 514. The lens 600 has a faceted detector lens 620 which is configured to transmit the light from LEDs of particular wavelengths. In particular, transmit lens 622 includes a green facet 630*a*, a red facet 630*b*, a blue facet 630*c*, and an IR facet 630*d*. Each facet 630*a*–630*d* receives and transmits the light from the respective LED 604*a*–604*d* onto the spot 514.

Corresponding light is reflected back onto the lens 600. In particular, the light is provided to the receiver lens 620 and from there to the detector 606. The detector 606 in turn provides signals corresponding to the impinging light to a detector processor.

The invention described in the above detailed description is not intended to be limited to the specific form set forth herein but, on the contrary, it is intended to cover such alternatives, modifications and equivalents as reasonably can be included within the spirit and the scope of the appended claims.

What is claimed is:

1. A system for detecting the location of a spot, comprising:

means for illuminating a surface including a spot that has contrasting reflective characteristics relative to an area surrounding the spot on the surface; and means for converting light reflected from the illuminated surface into a signal indicative of a location of said spot on the surface, said converting means including an opaque mask that is interposed between a receiver lens and a photodetector and includes first and second nonparallel apertures.

2. A system according to claims 1, wherein said opaque mask includes non-coplanar opaque regions defining said first and second nonparallel apertures.

3. A spot sensor for detecting the location of a spot on a surface, the sensor comprising:

an illuminator to illuminate a surface including a spot that has contrasting reflective characteristics relative to an area surrounding the spot on the surface;

a mask configured to modulate light that is reflected from the illuminated surface, the mask defining a first aperture and a second aperture, the second aperture having an inclined angle relative to the first aperture;

a photodetector to convert the modulated light to an electronic signal; and a processing circuit configured to determine the location of the spot on the surface by comparing information extracted from the electronic signal with information about the position of the spot sensor.

4. A spot sensor according to claim 3, wherein the first aperture is generally rectangular and the second aperture generally takes the shape of a parallelogram.

5. A spot sensor according to claim 4, wherein the first aperture and the second aperture form a chevron pattern.

6. A spot sensor according to claim 3, further comprising a lens between the illuminator and the surface for focusing the light on the surface.

7. A spot sensor according to claim 3, further comprising a lens between the surface and the mask for focusing the reflected light on the mask.

8. A spot sensor according to claim 3, wherein the spot sensor moves in a first direction relative to the surface and passes by and illuminates the spot.

9. A spot sensor according to claim 8, wherein the processing circuit determines the location of the spot in the first direction by determining the position of the spot sensor at the time that a first pulse occurs on the electronic signal, the first pulse being generated by the passage of a reflected image of the spot through the first aperture.

10. A spot sensor according to claim 8, wherein the processing circuit determines the location of the spot in a second direction by comparing the velocity of the spot sensor relative to the surface with the difference in time between a first pulse and a second pulse occurring on the electronic signal, the first pulse being generated by the passage of a reflected image of the spot through the first aperture and the second pulse being generated by the passage of the reflected image through the second aperture.

11. A spot sensor according to claim 3, wherein the processing circuit further approximates the size of the spot from information extracted from the electronic signal.

12. A spot sensor according to claim 11, wherein the processing circuit approximates the size of the spot by multiplying a rise time by a pulse width, the rise time and the pulse width relating to a pulse on the electronic signal that is generated by the passage of a reflected image of the spot through one of the apertures.

13. A spot sensor according to claim 3, wherein the processing circuit approximates the roundness of the spot from information extracted from the electronic signal.

14. A spot sensor according to claim 13, wherein the processing circuit approximates the roundness of the spot by comparing the product of a first rise time and a first pulse width with the product of a second rise the and a second pulse width, the first rise time and the first pulse width relating to a first pulse on the electronic signal that is generated by a passage of a reflected image of the spot through the first aperture and the second rise time and the second pulse width relating to a second pulse on the electronic signal that is generated by a passage of the reflected image through the second aperture.

15. A spot sensor for detecting the location of a spot on a surface, the sensor comprising:

an illuminator for illuminating the spot;

a mask for modulating light that is reflected from the surface, the mask comprising a first aperture and a second aperture, the second aperture having an inclined angle relative to the first aperture, wherein the mask has multiple layers, and the first and second apertures are defined in different layers of the mask;

a photodetector for converting the modulated light to an electronic signal; and a processing circuit for determining the location of the spot by comparing information extracted from the electronic signal with information about the position of the spot sensor.

16. A method for detecting the location of a spot on a surface comprising the steps of:

illuminating a surface including a spot that has contrasting reflective characteristics relative to an area surrounding the spot on the surface;

modulating light reflected from the illuminated surface using a mask defining a first and a second aperture, the second aperture having an inclined angle relative to the first aperture;

detecting the modulated light and generating an electronic signal corresponding to the modulated light; and determining the location of the spot on the surface by comparing information extracted from the electronic signal with information about the position of the spot sensor.

17. A method according to claim 16, wherein the method involves the use of a spot sensor that moves in a first direction relative to the surface and passes by and illuminates the spot.

18. A method according to claim 17, wherein the step of determining the location of the spot comprises a step of determining the location of the spot in the first direction by determining the position of the spot sensor at the time that a first pulse occurs on the electronic signal, the first pulse being generated by the passage of a reflected image of the spot through the first aperture.

19. A method according to claim 17, wherein the step of determining the location of the spot comprises a step of determining the location of the spot in a second direction by comparing the velocity of the spot sensor relative to the surface with the difference in time between a first pule and a second pulse on the electronic signal the first pulse being generated by the passage of a reflected a passage of the spot through the first aperture and the second pulse being generated by the passage of the reflected image through the second aperture.

20. A spot sensor for detecting the location of a spot on a surface, the sensor comprising:

an illuminator to illuminate a surface including a spot that has contrasting reflective characteristics relative to an area surrounding the spot on the surface;

a mask configured to modulate light that is reflected from the illuminated surface, the mask comprising a first layer having a first opaque region, the first opaque region defining a first aperture, and a second layer having a second opaque region, the second opaque region defining a second aperture;

a photodetector to convert the modulated light from the mask to an electronic signal; and a processing circuit configured to determine the location of the spot on the surface by comparing information extracted from the electronic signal with information about the position of the spot sensor.

21. A spot sensor according to claim 20, wherein the first aperture is generally rectangular in shape and the second aperture generally takes the shape of a parallelogram, wherein the first and second opaque regions filer define a third aperture that is generally rectangular in shape and that is generally parallel to the first aperture, and wherein the second aperture forms an inclined angle relative to the first and third apertures.

22. A spot sensor according to claim 20, wherein the mask further comprises a third layer having a third opaque region, the third opaque region defining a third aperture, wherein the first opaque region further defines a fourth aperture, the second opaque region further defines a fifth aperture and the third opaque region further defines a sixth aperture.

23. A spot sensor according to claim 22, wherein the first, second and third apertures are generally rectangular and are generally parallel to one another, and the fourth, fifth and sixth apertures generally take the shape of a parallelogram and form an inclined angle relative to the first, second and third apertures.

* * * * *